United States Patent [19]
Kato et al.

[11] Patent Number: 5,859,945
[45] Date of Patent: Jan. 12, 1999

[54] ARRAY TYPE LIGHT EMITTING ELEMENT MODULE AND MANUFACTURING METHOD THEREFOR

[75] Inventors: Takashi Kato; Masakazu Shigehara, both of Yokohama, Japan

[73] Assignee: Sumitomo Electric Industries, Ltd., Osaka, Japan

[21] Appl. No.: 777,087

[22] Filed: Dec. 30, 1996

[51] Int. Cl.$^6$ .................................................. G02B 6/36
[52] U.S. Cl. ........................... 385/89; 385/37; 385/93; 385/33
[58] Field of Search ............................... 385/37, 88, 89, 385/90, 91, 92, 93, 94, 49, 33, 24; 372/6

[56] References Cited

U.S. PATENT DOCUMENTS

| | | | |
|---|---|---|---|
| 5,166,940 | 11/1992 | Tumminelli et al. ...................... | 372/6 |
| 5,428,697 | 6/1995 | Dolfi et al. ............................... | 385/24 |
| 5,530,709 | 6/1996 | Waatrs et al. ............................. | 372/6 |
| 5,561,675 | 10/1996 | Bayon et al. ............................. | 372/6 |

OTHER PUBLICATIONS

Maxwell et al, "Demonstration of a Semiconductor Externals Cavity Laser Using a UV Written Grating in a Planar Silica Waveguide", Electronics Letters, vol. 30, No. 18, Sep. 1, 1994, p. 1486.

Cambell et al, "Wavelength Stable Uncooled Fibre Grating Semiconductor Laser for use in an all Optical WDM Access Network", Electronics Letters, Jan. 18, 1996, vol. 32, No. 2, pp. 119–120.

Simgibl et al, "An 18–Channel Multifrequency Laser", IEEE Photonics Technology Letters, vol. 8, No. 7, pp. 870–872, 1996.

*Primary Examiner*—Hung N. Ngo
*Attorney, Agent, or Firm*—Pillsbury Madison & Sutro LLP

[57] ABSTRACT

An array type light emitting element module having a plurality of light emitting elements, a plurality of optical fibers (2) being placed in a one-to-one correspondence with the light emitting elements (1) so as to receive light emitted therefrom on one end face, and diffraction gratings (2*a*) each having a specific diffraction wavelength which are formed in the optical fibers near the incident ends of the optical fibers (2).

11 Claims, 5 Drawing Sheets

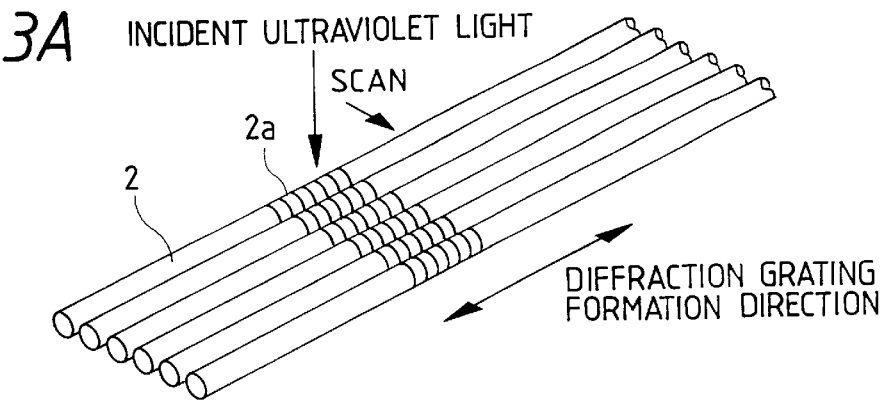
FIG. 3A
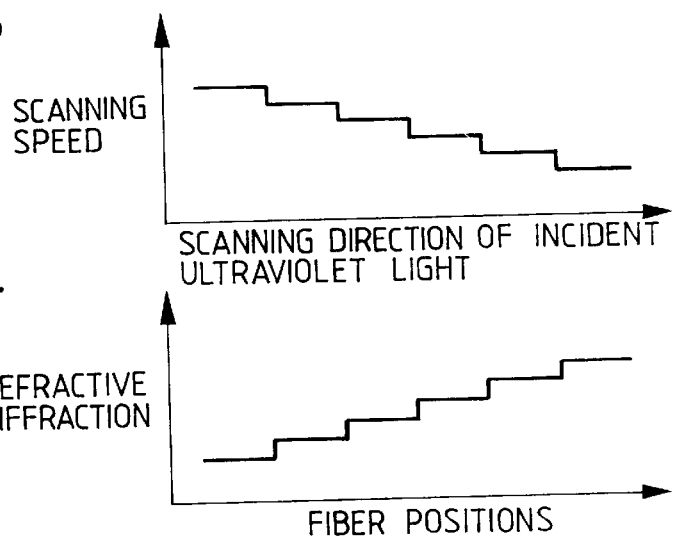
FIG. 3B
FIG. 3C
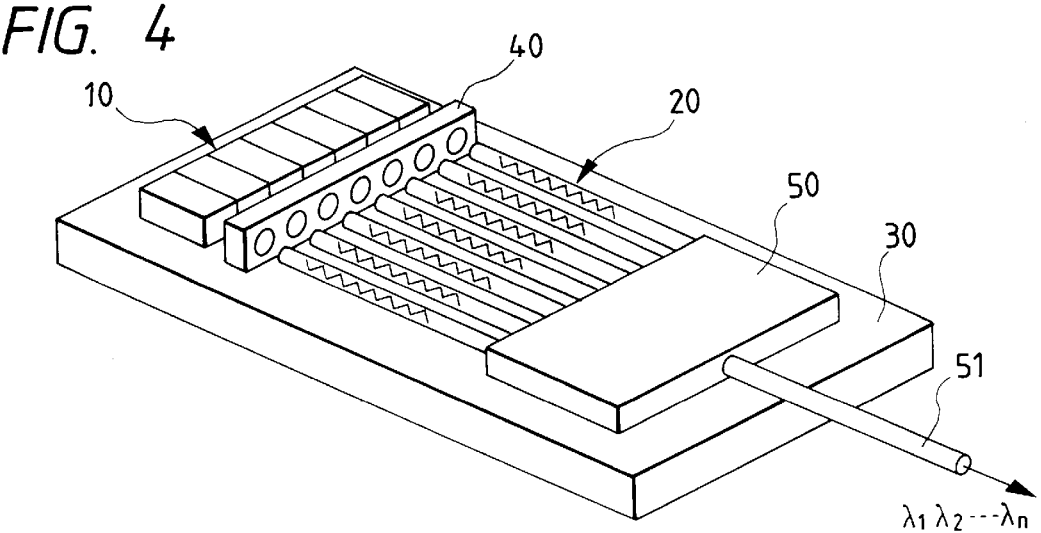
FIG. 4

PELTIER EFFECT DEVICE DRIVING CIRCUIT

ARRAY TYPE LIGHT EMITTING ELEMENT MODULE AND MANUFACTURING METHOD THEREFOR

BACKGROUND OF THE INVENTION

1. Field of the Invention

This invention relates to an array type light emitting element module, and particularly, to the configuration of a new light emitting element module capable of outputting laser beams of a plurality of desired types of oscillation wavelengths at the same time.

2. Description of the Related Art

There is a WDM (wavelength division multiplex) method for enabling higher-speed and higher-density data transmission using light signals. In this method, light signals which are different in wavelength are superposed on each other for transmission on one light transmission line, whereby the transmission density can be improved efficiently.

The WDM method requires for one to use a plurality of laser light sources which are different from each other in oscillation wavelength. Then, a plurality of light emitting element modules comprising DFB (distributed feedback) lasers, DBR (distributed bragg reflector) lasers, etc., which are different in oscillation wavelength are provided and the light waves of laser beams emitted from the semiconductor modules are combined by a light wave combiner for generating transmission light.

However, in order to form light sources for the WDM transmission system by the method as described above, it is difficult to complete light emitting element modules of predetermined oscillation wavelengths required for WDM transmission design. Since the light emitting element modules must be assembled separately and be furthermore combined, the number of manufacturing steps is increased resulting in an increase in cost.

Further, since the conventional WDM light source is provided by combining separately manufactured light emitting element modules, it is extremely difficult to miniaturize the WDM light source as a final product. In contrast, already known is a light emitting element module, as shown in FIG. 9, comprising a plurality of semiconductor lasers and a plurality of optical fibers integrally combined mainly for the purposes of high-density packaging and cost reduction. This light emitting element module consists of a light emitting element array 10 comprising a plurality of light emitting elements arranged on one row, an optical fiber array 20 comprising a plurality of optical fibers 2 placed on one array plane in parallel, and a common board 30 on which the light emitting element array 10 and the optical fiber array 20 are mounted. In fact, this type of light emitting element module further has an optical element 40 of lenses, etc., inserted between the light emitting face of the light emitting element array 10 and the incident end face of the optical fiber array 20 for enhancing the coupling efficiency of the light emitting elements 1 and the optical fibers 2.

However, in the conventional light emitting element module including a plurality of light emitting elements and optical fibers as described above, the light emitting elements 1 contained in the light emitting element array 10 have the same light emitting wavelength and cannot be used as a WDM light source requiring light signals which are different in wavelength. That is, the conventional light emitting element module can be only applied to simple parallel light transmission.

SUMMARY OF THE INVENTION

It is therefore an object of the invention to provide a new light emitting element module capable of being miniaturized and outputting laser beams of different wavelengths provided by combining desired oscillation wavelengths, and a manufacturing method thereof.

An array type light emitting element module according to the present invention comprises a plurality of light emitting elements; a plurality of optical fibers being placed in a one-to-one correspondence with the plurality of light emitting elements to receive light emitted therefrom on one end face; and diffraction gratings, each having a specific diffraction wavelength, and each being formed in an optical fiber of the plurality of optical fibers; wherein the diffraction grating portions are formed in the neighborhood of incident ends of the optical fibers.

A method of manufacturing the array type light emitting element module according to the present invention comprises the steps of: forming diffraction gratings in optical fibers; and fixing said optical fibers on a predetermined array plane to form an array type light emitting element module.

According to the present invention, an array type light emitting element module for emitting laser beams which are different in wavelength in a desired wavelength-combination can be provided easily and reliably. Therefore, the light emitting element module can be used to realize high-density and high-speed light transmission in a wavelength multiplex system easily and inexpensively.

For the light emitting element module according to the invention, after the optical fibers are fixed, the diffraction gratings can be formed so that desired oscillation wavelengths are combined.

BRIEF DESCRIPTION OF THE DRAWINGS

In the accompanying drawings:

FIGS. 3A to 3C are an illustration and graphs for explaining another formation method of diffraction gratings in optical fibers in the array type light emitting element module according to the invention;

FIG. 4 shows an example of another configuration example of an array type light emitting element module according to the invention;

PREFERRED EMBODIMENTS OF THE INVENTION

Figure 1:
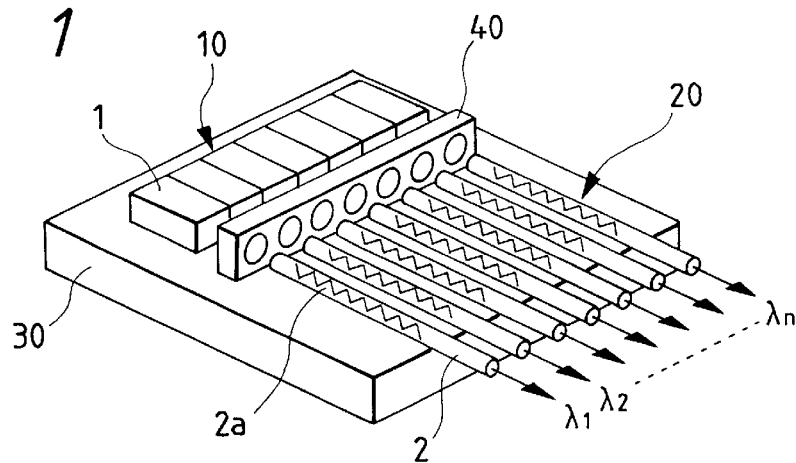
FIG. 1 shows an example of a configuration of an array type light emitting element module according to the invention.

Preferred embodiments of the present invention will be described as following referring to the accompanying drawings.

The light emitting element module according to the present invention has a feature that diffraction gratings are formed in portions near the incident ends of the optical fibers as emission ports for propagating light emitted from the light emitting elements to the outside and that laser light of a desired oscillation wavelength can be output for each of the output optical fibers.

That is, in order to attempt to generate light signals of different wavelengths in a general array type light emitting element module, a diffraction grating is formed in each semiconductor light emitting element per se to oscillate in a desired wavelength. However, in this method, it is difficult to combine desired oscillation wavelengths finally with good reproducibility because of the following reasons. That is, the refractive index of the material in the diffraction grating formation portion varies with change in the poured carrier density into each semiconductor light emitting element and temperature change. Further, there are variations in phases of the diffraction gratings on the end faces of the light emitting elements.

On the other hand, according to the light emitting element modules of the present invention, a diffraction grating is formed in the neighborhood of each incident end of the optical fiber so as to be used as external resonators of a semiconductor laser. Accordingly, laser light of a desired oscillation wavelength can be output for each of the optical fibers. A light emitting element module with a combination of emitted light beams of desired wavelengths can be manufactured by selecting appropriate specifications when the diffraction gratings are formed. The external resonator structure is enabled because the reflective spectrum width of the diffraction grating formed in the optical fiber is sufficiently narrower than the gain width of the semiconductor laser.

In order to form a diffraction grating, a method of irradiating an optical fiber with ultraviolet or X rays for changing the refractive index of the optical fiber itself is available. In this method, a diffraction grating of a desired diffraction wavelength can be comparatively easily formed by controlling the irradiation intensity and the irradiation time.

In the light emitting element module according to the present invention, the diffraction gratings which determine the oscillation wavelength are formed in the optical fibers in which the refractive index is less changed due to external factors. Therefore, oscillation wavelengths as designed can be obtained easily and reliably unlike the light emitting element module having the diffraction gratings formed in the light emitting elements themselves. Since the oscillation wavelength produced through the diffraction grating formed in the optical fiber has very small temperature dependency of about 0.01 nm/°C., the entire light emitting element module has a stable characteristic against temperature change. However, in order to control the oscillation wavelength more strictly, a Peltier effect device, etc., is used to control the temperatures of the diffraction gratings formed in the optical fibers so as to more strictly perform temperature control.

A general light emitting element module changes the drive current of light emitting elements to modulate output light signals. However, in such a system, the modulation speed is slow. Then, according to one preferred embodiment of the invention, the light emitting elements generate stationary light signals and the light signals are modulated by the additionally mounted light signal modulator to thereby realize extremely fast modulation speed.

In order to operate the light emitting element module in the system as described above, light output of the light emitting element module is preferably stable. Therefore, for example, it is desirable to monitor the light emitting element operation state from light output of at least one of the optical fibers and perform feedback control of the Peltier effect device fitted to the diffraction gratings of the optical fibers so as to stabilize the operating temperature.

As described above, the light emitting element module having any desired wavelength combination of different oscillation wavelengths can be supplied. Consequently, a system capable of executing data transmission by wavelength multiplexing can be easily constructed.

The light emitting element modules according to the invention will be discussed more specifically with reference to the accompanying drawings. The following disclosure not specific embodiments of the invention does not limit any technical range of the invention.

FIG. 1 shows an example of the basic configuration of an array type light emitting element module according to the invention.

Figure 9:
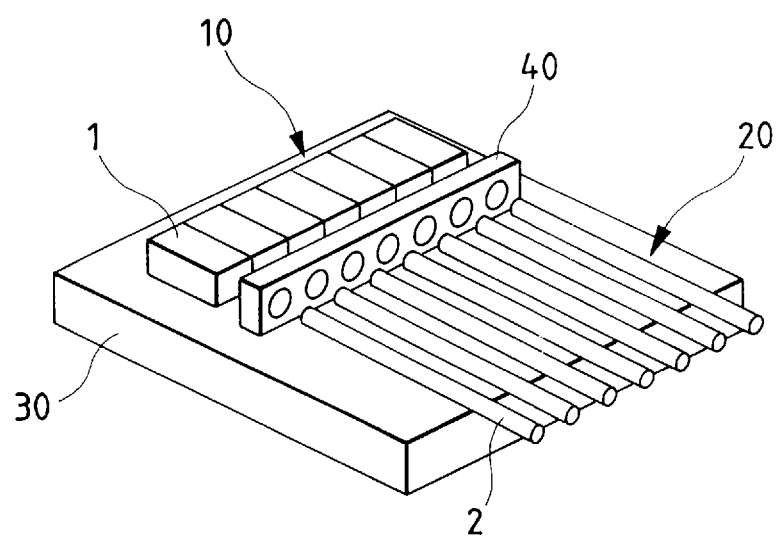
FIG. 9 shows the configuration of a conventional light emitting element module.

As shown in the drawing, the configuration of the light emitting element module is the same as that of the conventional light emitting element module shown in FIG. 9 except that it further includes diffraction gratings 2a formed in the neighborhood of the incident ends of optical fibers 2 making up an optical fiber array 20.

That is, the light emitting element module is mainly made up of a light emitting element array 10 and an optical fiber array 20 mounted on a board 30, and further includes a lens array 40 inserted between the light emitting element array 10 and the optical fiber array 20. The above-mentioned diffraction gratings 2a are formed in the neighborhood of the incident ends of the optical fibers 2 making up the optical fiber array 20.

In the light emitting element module thus configured, the diffraction gratings 2a formed in the optical fibers 2 serve as external resonators for the light emitting elements 1. Therefore, the diffraction wavelength in each diffraction grating is set properly so that the oscillation wavelength of laser light emitted for each optical fiber 2 can be set as desired.

The diffraction gratings formed in the optical fibers may be previously formed before the optical fibers are mounted on the board. Alternatively, after the optical fibers are mounted on the board, the diffraction gratings are worked to form diffraction gratings, as described later.

That is, for example, there are a phase grating method and an irradiation method with X-rays as well as an interference method to form the diffraction gratings in the optical fibers. In the interference method, a specific area of an optical fiber is irradiated with a plurality of ultraviolet laser beams which are different in irradiation angle and at the same time to thereby form a cyclic refractive index distribution by mutual interference of the laser beams. In the phase grating method, ultraviolet laser light is made incident on a phase grating having desired synchronization and irradiating a specific area of an optical fiber with an interference pattern of beams of diffraction light produced by the phase grating for forming a cyclic refractive index distribution. In the X ray irradiation method, a mask having a refractive index distribution cycle formed in an X fiber is provided and is irradiated with X rays for forming a refractive index distribution. In these methods, such a mask for exposing only an area in which a diffraction grating of a specific optical fiber is formed can be used to form a diffraction grating of any desired specifications only in a desired area of a desired optical fiber.

In the methods of irradiating optical fibers with ultraviolet rays and X-rays described above, diffraction gratings different in diffraction wavelength can be easily formed by controlling the irradiation intensity and the irradiation time. Therefore, after optical fibers are fixed on the board, diffraction gratings which have different specifications for the optical fibers can be formed.

Figure 2A:
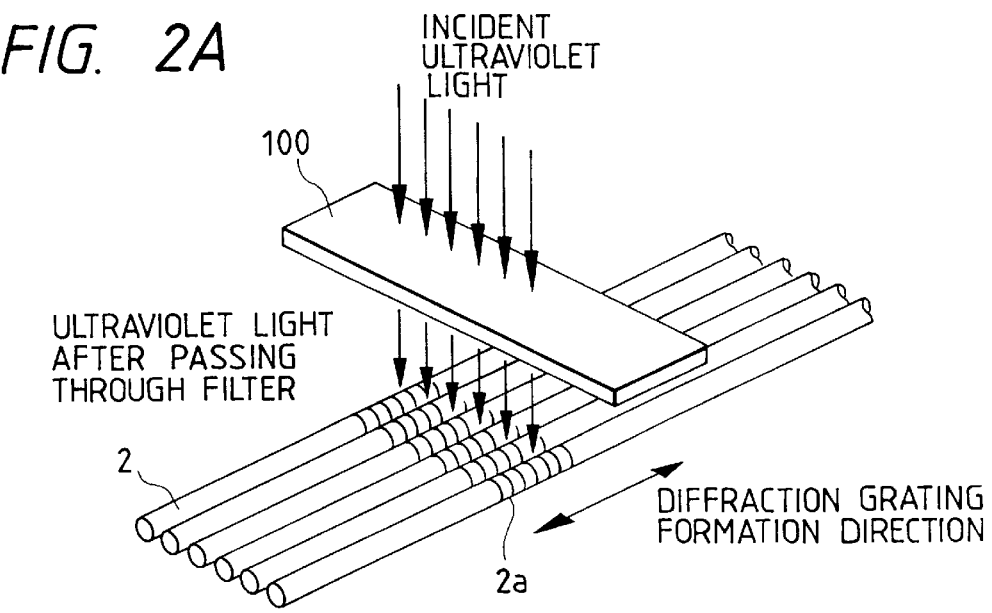
FIGS. 2A and 2B are an illustration and a graph respectively, for explaining a formation method of diffraction gratings in optical fibers in the array type light emitting element module according to the invention.

FIG. 2A is an illustration to show a method for forming diffraction gratings which are different in diffraction wavelength near the incident ends of optical fibers by irradiating them with ultraviolet rays having a light strength distribution in a diffraction grating cycle for forming a diffraction grating.

Figure 2B:
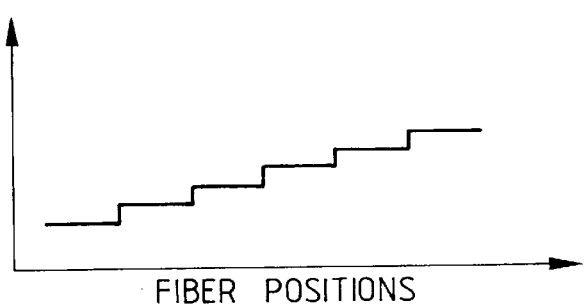

In this method, diffraction gratings are formed by irradiating the portions near the incident ends of optical fibers 2 with ultraviolet rays. That is, the portions are irradiated with the ultraviolet rays through a filter 100 having a ultraviolet ray transmission amount distribution as shown in FIG. 2A, whereby the intensity of the ultraviolet rays with which the optical fibers 2 are irradiated can be changed as shown in FIG. 2B. According to this method, diffraction gratings having proper diffraction wavelengths can be formed because average irradiation intensity varies from one optical fiber to another.

FIG. 3 is an illustration to show another method for forming diffraction gratings which are different in diffraction wavelength from each other in optical fibers by applying ultraviolet rays.

In this method, diffraction gratings are formed by scanning ultraviolet rays over areas near the incident ends of the optical fibers 2, as shown in FIG. 3A. The ultraviolet ray scanning speed varies from one optical fiber to another, as shown in FIG. 3B, and therefore an average irradiation amount of the optical fibers 2 with the ultraviolet rays changes from fiber to fiber. According to this method, diffraction gratings having any desired diffraction wavelengths which are different for each optical fiber can be formed, as shown in FIG. 3C.

Diffraction gratings which are different in diffraction wavelength for each optical fiber are thus formed, whereby a laser beam of a proper wavelength can be emitted from each optical fiber 2. Specifically, the gain width of a general semiconductor laser is about 100 nm and the laser can be used if the spacing is equal to or greater than the oscillation wavelength width (0.1 nm or less). Therefore, for example, if the gain peak of a semiconductor laser is set to 1550 nm and the wavelength spacing of diffraction wavelengths in an optical fiber is set to 1 nm in a band of 1550±50 nm, lasers of a maximum of 100 wavelengths can be output. If the gain peak of a semiconductor laser is set to 1310 nm, for example, and the oscillation wavelengths are set in a 1-nm spacing in a band of 1310±10 nm, 100 wavelengths can also be taken. If a large number of wavelengths, as many as 100 are not actually required, a necessary number of wavelengths may be set in a band near the peak wavelength of the gain. Preferably, an ultraviolet laser of wavelength 244–248 nm can be used as ultraviolet rays with which the optical fibers are irradiated.

FIG. 4 is a view showing an example of another configuration of an array type light emitting element module according to the invention.

As shown in the drawing, the light emitting element module further includes an optical wave coupler 50 mounted on a board 30 as compared with the light emitting element module shown in FIG. 1. That is, in the light emitting element module shown in FIG. 4, an optical fiber array 20 coupled to light emitting elements 10 is coupled at the rear end to the optical wave coupler 50 mounted on the common board 30. The optical wave coupler 50 has a function of combining waves of light poured from the optical fiber array 20 and outputting the resultant light to an optical fiber 51, an emission port. Therefore, laser beams having proper wavelengths are superposed on each other, then emitted through the optical fiber 51. The light emitting element module of the configuration can be used singly as a light source for light communication of the WDM system.

An optical fiber wave coupler is constituted by cores of optical fibers made to approach each other until propagation light of one optical fiber interferes with that of another, a plane waveguide having a pattern shaped like the letters Y or X, and the like can be used singly or in combination as the optical wave coupler that can be used with the light emitting element module. In the example shown in FIG. 2A, waves of all light beams emitted from the light emitting elements on the board 30 are combined and output to the single output port. However, for example, a light emitting element module having a plurality of output ports with groups of two light emitting elements each can also be configured.

Figure 5:
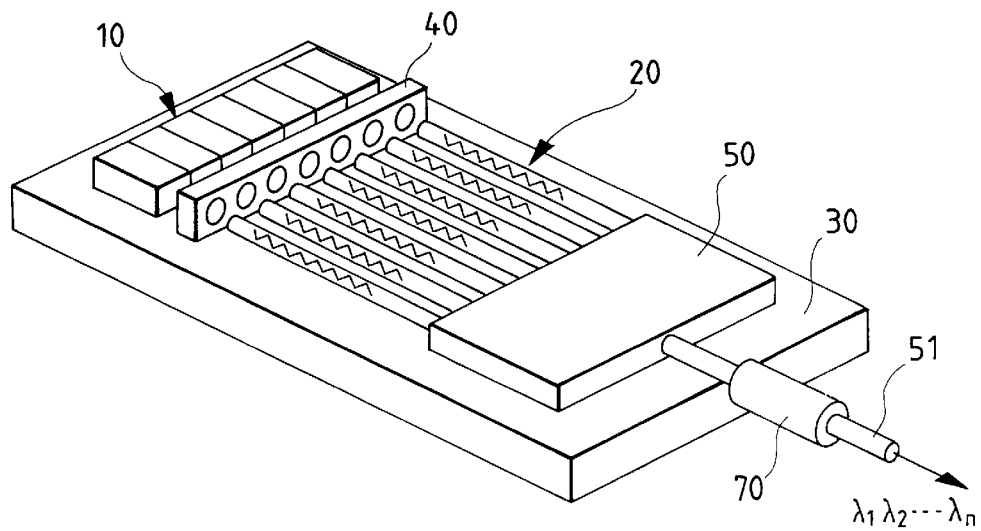
FIG. 5 shows an example of another configuration of an array type light emitting element module according to the invention.

FIG. 5 is a view showing an example of another configuration of an array type light emitting element module according to the invention.

The light emitting element module shown in the figure further includes an optical isolator 70 in addition to the components of the light emitting element module shown in FIG. 4. That is, an optical isolator needs to be inserted between a light emitting element module and its following light transmission line in applications of analog light transmission, etc., wherein light returned by reflection on the light transmission line affects light emitting elements. However, to use the conventional light emitting element module, it is necessary to mount a large number of optical isolators in response to the number of light emitting elements, leading to extremely high costs. In contrast, in the light emitting element module according to the invention, a single optical isolator 70 may be inserted on the propagation light path of an optical fiber 51 of an output port, as shown in FIG. 5. Therefore, the number of manufacturing steps is lessened as a whole and material costs can also be decreased.

Figure 6:
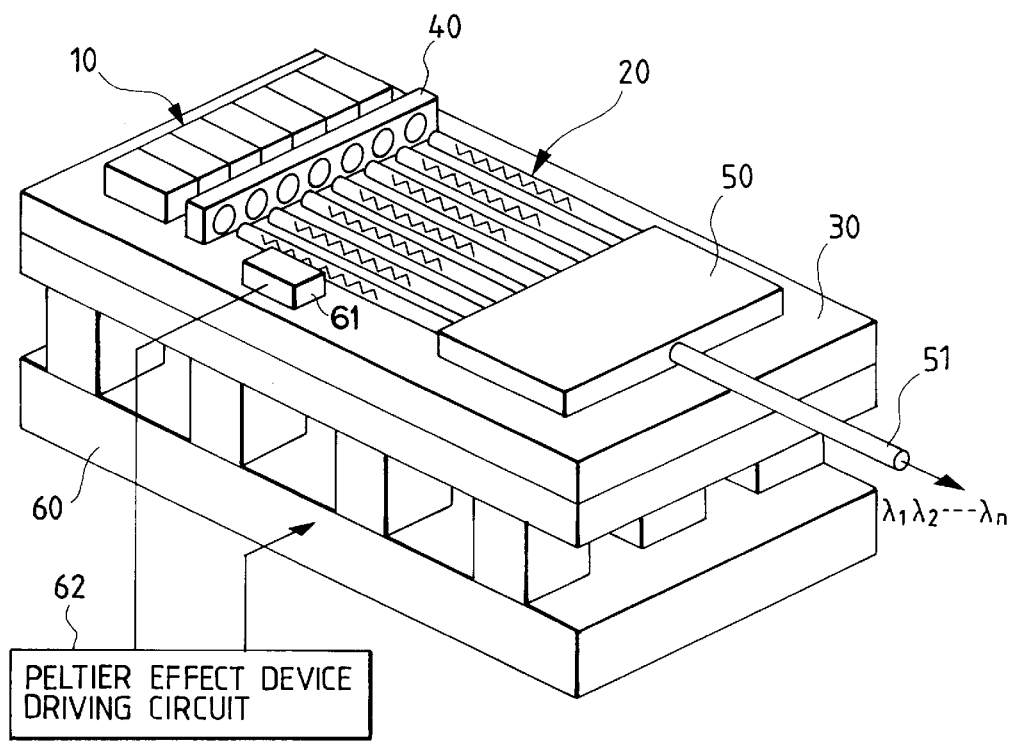
FIG. 6 shows an example of another configuration of an array type light emitting element module according to the invention.

FIG. 6 is a view showing an example of another configuration of an array type light emitting element module according to the invention.

The light emitting element module shown in the figure comprises the entire light emitting element module shown in FIG. 4 placed on a Peltier effect device 60. This configuration enables extremely precise control of the entire temperature of the light emitting element module. That is, for example, a temperature detection device 61 such as a thermistor is mounted on a board 30 and while change in output of the temperature detection device (resistance value if the temperature detection device is a thermistor) is monitored, a Peltier effect device drive circuit 62 for supplying a drive current to the Peltier effect device 60 is controlled in feedback, whereby the wavelength characteristic of light emitted from the light emitting element module can be controlled extremely precisely. Specifically, temperature control of up to about 0.01 degrees centigrade is enabled in the light emitting element module of the configuration, so that diffraction wavelength change in a diffraction grating normally having a temperature characteristic of about 0.01 nm/degree can be suppressed to $10^{-4}$ nm or less. Thus, output with extremely stable wavelength can be provided.

Figure 7:
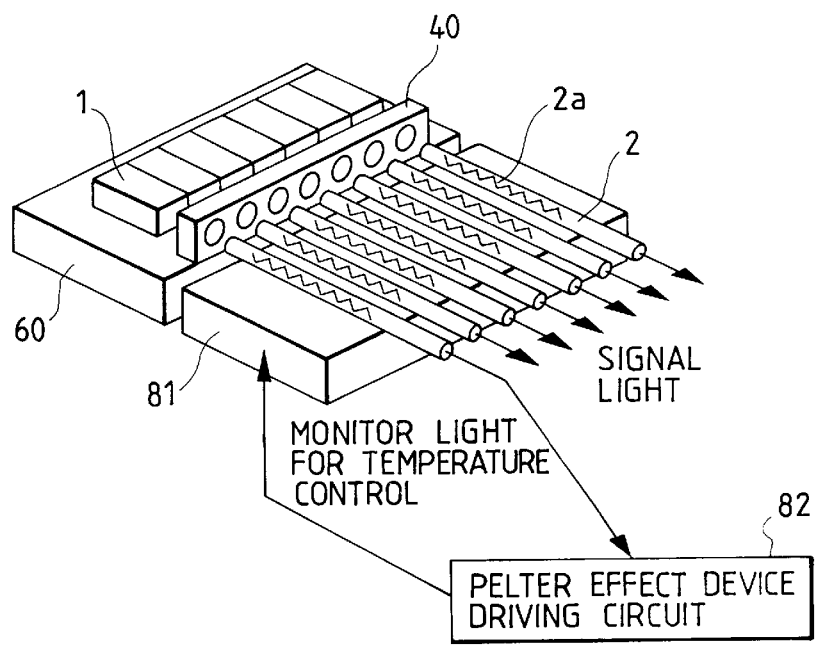
FIG. 7 shows an example of another configuration of an array type light emitting element module according to the invention.

FIG. 7 is a view showing an example of another configuration of an array type light emitting element module according to the invention. Components identical with or similar to those previously described with reference to FIG. 1 are denoted by the same reference numerals in FIG. 7 and will not be discussed in detail again.

As shown in FIG. 7, the light emitting element module further includes a Peltier effect device 81 for cooling-diffraction gratings 2a of optical fibers 2 and a Peltier effect device drive circuit 82 for supplying a drive current to the Peltier effect device 81 in addition to the basic configuration of the array type light emitting element module shown in FIG. 1. The Peltier effect device drive circuit 82 receives light output of one of the optical fibers 2 with the diffraction gratings and senses temperature change in the diffraction grating 2a from light emitted from the optical fiber 2 for performing feedback control of the Peltier effect device 81. This configuration enables automatic compensation of light output change caused by temperature change. Since control accuracy in the configuration seems to be about 1 degree, it is lower than that in the configuration shown in FIG. 6. On the other hand, the light emitting element module has the advantage that it eliminates the need for mounting an additional device like the temperature detection device.

Figure 8:
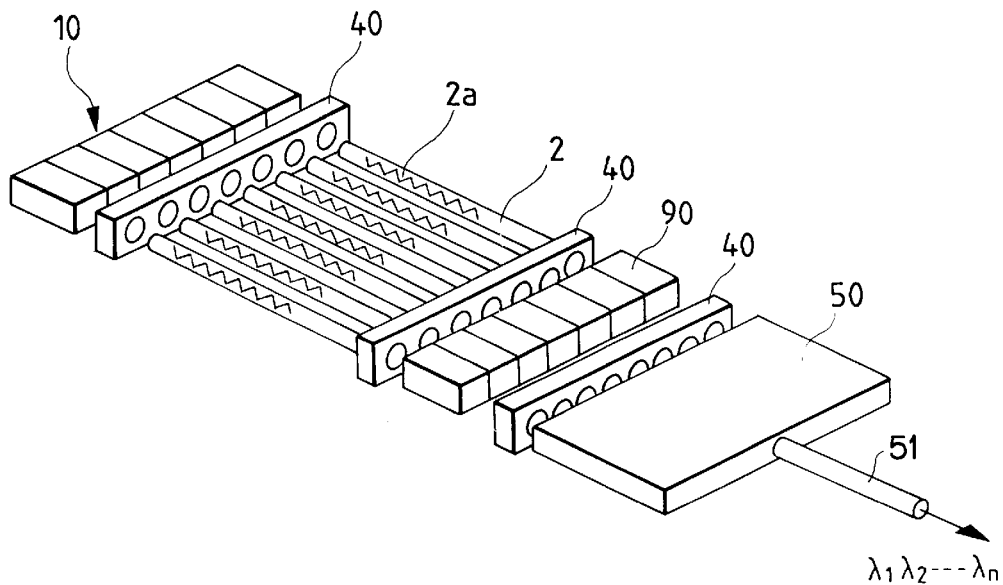
FIG. 8 shows an example of another configuration of an array type light emitting element module according to the invention.

FIG. 8 is a view showing an example of another configuration of an array type light emitting element module according to the invention. Components identical with or similar to those previously described with reference to FIG. 4 are denoted by the same reference numerals in FIG. 8 and will not be discussed in detail again.

As shown in FIG. 8, the light emitting element module further includes a light modulator 90 for receiving light signals from an output port 51 of an optical wave coupler 50 in addition to the configuration of the array type light emitting-element module shown in FIG. 4. That is, if a drive current of light emitting elements 1 themselves is changed for modulating output light signals, the modulation speed slows down. In contrast, in the light emitting element module shown in FIG. 8, stationary light signals are generated from the light emitting elements themselves and are modulated by the additionally mounted light signal modulator 90, whereby the modulation speed can be improved.

Available as the light signal modulator 90 is a modulator using a $LiNbO_3$, GaAs/AlGaAs or InGaAsP/InP semiconductor device using a multiple quantum well structure, etc.

The light emitting element module of the configuration with the external modulator according to the invention can accomplish a modulation speed of up to about 100 GHz although the limit of the modulation speed of the conventional light emitting element module with no external modulator is 10 GHz or less.

What is claimed is:

1. An array type light emitting element module comprising:

a plurality of light emitting elements;

a plurality of optical fibers placed in a one-to-one correspondence with said plurality of light emitting elements so that each fiber receives light emitted from its respective light emitting element on one end face thereof; and a plurality of diffraction gratings, each having a specific diffraction wavelength and each being formed in a respective one optical fiber of said plurality of optical fibers, wherein said plurality of diffraction gratings are formed proximate to incident ends of said optical fibers, and a first diffraction wavelength of at least one of said diffraction gratings differs from a second diffraction wavelength of at least a second one of said diffraction gratings.

2. An array type light emitting element module as claimed in claim 1, wherein said plurality of optical fibers are arranged on a specific array plane such that they are substantially parallel to each other.

3. An array type light emitting element module as claimed in claim 1, wherein said plurality of light emitting elements and said incident ends of said optical fibers are mounted on a common board.

4. An array type light emitting element module as claimed in claim 1, further comprising an optical system placed between said light emitting elements and the incident ends of said optical fibers.

5. An array type light emitting element module as claimed in claim 4, wherein said optical system is a lens array.

6. An array type light emitting element module as claimed in claim 1, wherein at least one of said plurality of light emitting elements and said plurality of optical fibers are mounted on a Peltier effect device.

7. An array type light emitting element module as claimed in claim 6, wherein light output from at least one optical fiber of said plurality of optical fibers is monitored and said Peltier effect device is operated in response to the light output, thereby controlling temperatures of at least one of said plurality of light emitting elements and said plurality of diffraction gratings.

8. An array type light emitting element module as claimed in claim 1, further comprising an optical wave coupler to which emission ends of said plurality of optical fibers are coupled.

9. An array type light emitting element module as claimed in claim 8, wherein said optical wave coupler is mounted on a common board together with said plurality of light emitting elements and said plurality of optical fibers.

10. An array type light emitting element module as claimed in claim 8, further comprising an optical isolator inserted on a propagation light path on an output side of said optical wave coupler.

11. An array type light emitting element module as claimed in claim 8, further comprising a light modulator for modulating light emitted from said plurality of diffraction gratings by an arbitrary signal, so that each light emitting element of said plurality of light emitting elements produces stationary light output.

* * * * *